United States Patent [19]

Cork et al.

[11] 3,716,986
[45] Feb. 20, 1973

[54] ROLLING CONDUCTOR SUPPORT

[75] Inventors: Gordon H. Cork, Birmingham; David M. Tenniswood, Troy, both of Mich.

[73] Assignee: Gemco Electric Company, Clawson, Mich.

[22] Filed: Oct. 21, 1970

[21] Appl. No.: 82,566

Related U.S. Application Data

[63] Continuation-in-part of Ser. No. 41,842, June 1, 1970, abandoned.

[52] U.S. Cl. ................... 59/78.1, 191/12 C, 248/52
[51] Int. Cl. ........................................... F16g 13/16
[58] Field of Search ............ 59/78.1; 248/49, 51, 52; 191/12 C

[56] References Cited

UNITED STATES PATENTS

| | | | |
|---|---|---|---|
| 3,566,603 | 3/1971 | Chadwick | 59/78.1 |
| 3,504,864 | 4/1970 | Kurlandsky | 59/78.1 |
| 3,053,358 | 9/1962 | Gross | 248/49 |
| 3,233,850 | 2/1966 | Merker | 248/49 |
| 3,284,036 | 11/1966 | Nansel | 248/49 |
| 3,382,668 | 5/1968 | Berkes | 59/78.1 |
| 3,448,953 | 6/1969 | Kurlandsky | 248/51 |
| 3,546,875 | 12/1970 | Weber | 59/78.1 |

FOREIGN PATENTS OR APPLICATIONS

| | | | |
|---|---|---|---|
| 1,142,150 | 2/1969 | Great Britain | 248/52 |

Primary Examiner—Charles W. Lanham
Assistant Examiner—Gene P. Crosby
Attorney—Burton and Parker

[57] ABSTRACT

A rolling conductor support for supporting, guiding and protecting electrical, hydraulic, coolant and the like conductors extending between parts of machines which move relative to one another on guides or tracks. The conductor support comprises a plurality of parallel chains connected in laterally spaced relation by conductor supporting bridges to which the conductors are fastened by clips or retainer loops. The chains are composed of links pivotally connected at overlapping contiguous ends, with a slot in one end of each link receiving a stop pin in the overlapping contiguous end of the next link, the length of the slots determining the bending radius of the chains.

1 Claim, 16 Drawing Figures

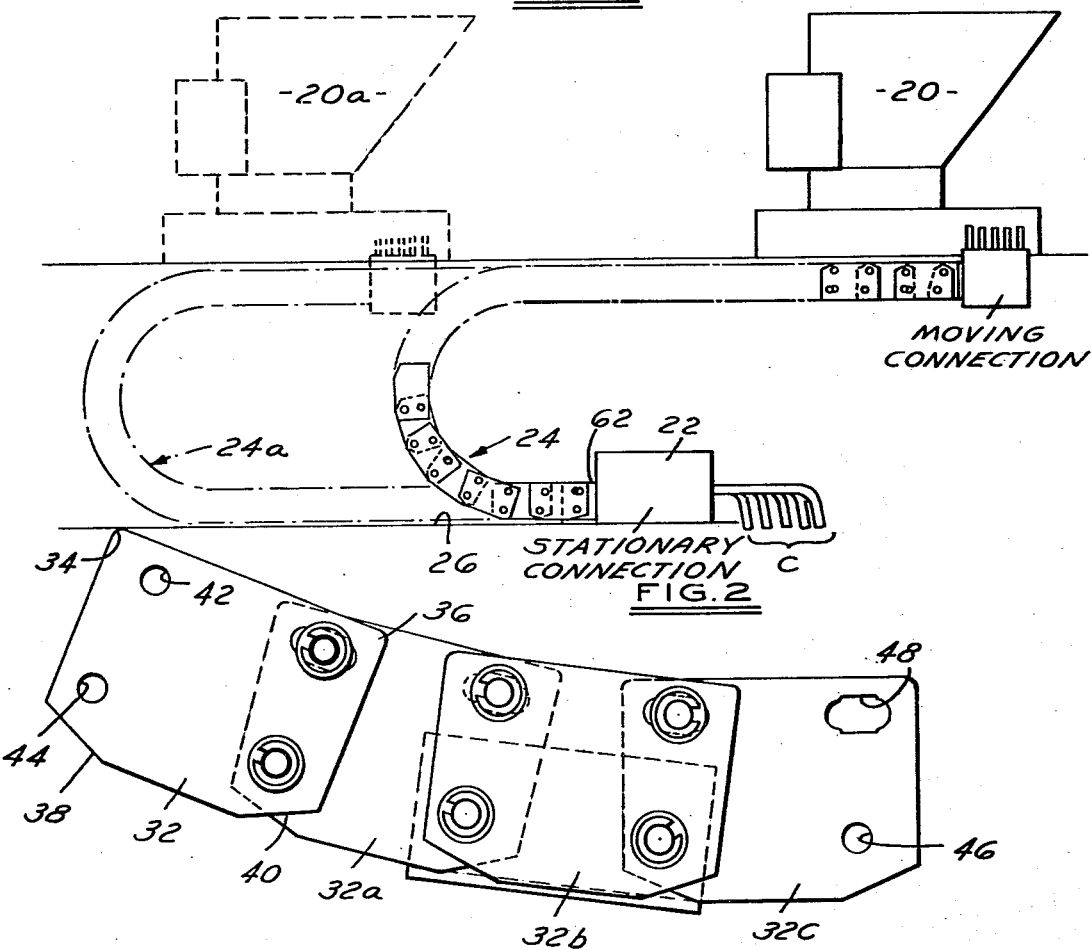
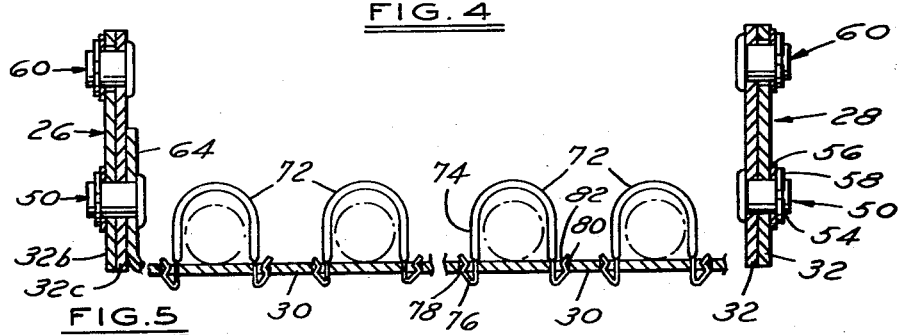
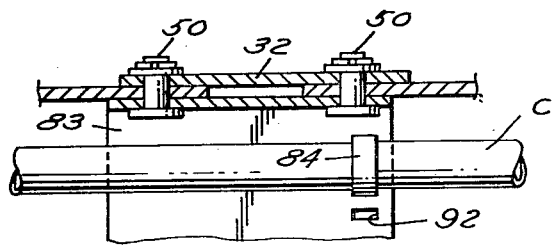

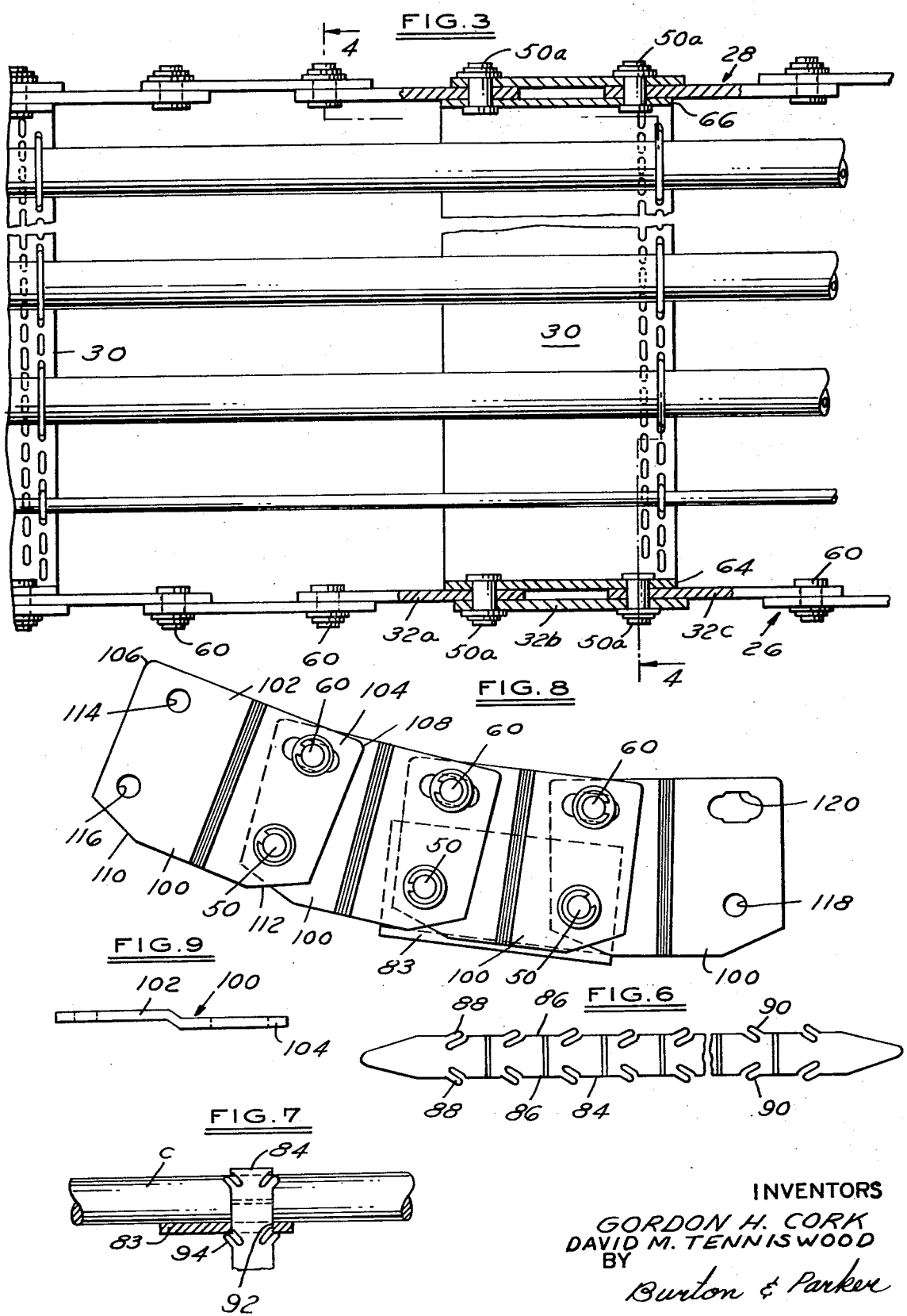

PATENTED FEB 20 1973 3,716,986

INVENTORS
GORDON H. CORK
DAVID M. TENNISWOOD
BY
Burton & Parker

ATTORNEYS

INVENTORS
GORDON H. CORK
DAVID M. TENNISWOOD
BY
Burton & Parker
ATTORNEYS

ROLLING CONDUCTOR SUPPORT

This application is a continuation-in-part of our copending application Ser. No. 41,842, filed June 1, 1970, now abandoned.

BACKGROUND OF THE INVENTION

This invention relates to improvements in rolling conductor supports of the general type shown in U.S. Pat. Nos. such as 2,864,907; 2,975,807; 3,053,358 and others where the object is to support, guide and protect electric hydraulic, pneumatic, coolant and the like conductors which extend between parts of machines that move relative to each other on guides or tracks.

A primary object is to provide a rolling conductor support of simple, foolproof design, which positively controls the radius of its rolling bend without subjecting the machine operator to the danger inherent in prior art designs, of catching his clothing or limbs in the moving conductor support, and in particular the chains thereof.

Another object of the invention is to provide a rolling conductor support so designed that it may be fabricated in varying widths using various multiples and/or multiple sizes of its components.

BRIEF DESCRIPTION OF THE DRAWINGS

FIG. 1 is a side elevation of a rolling conductor support made according to the invention showing such in operative position on a machine;

FIG. 2 is an enlarged detail of four links of one of the side chains of the rolling conductor support of FIG. 1;

FIG. 3 is a plan view of a portion of a rolling conductor support made according to one embodiment of the invention;

FIG. 4 is a cross-sectional view taken along line 4—4 of FIG. 3;

FIG. 5 is a partial plan view of a portion of a rolling conductor support showing a modified conductor retainer;

FIG. 6 is a plan view of the conductor retainer used with the support shown in FIG. 5;

FIG. 7 is an cross-sectional view showing the conductor retainer of FIG. 6 positioned to hold a conductor in place;

FIG. 8 is an enlarged detail similar to FIG. 2 showing three links of a modified side chain;

FIG. 9 is a plan view of one of the links shown in FIG. 8;

In FIG. 1 is shown a representative installation for the rolling conductor support 24. Such shows a stationary connection and a moving connection. The moving connection is part of a moving machine element 20 that transverses rectilinearly above the stationary connection between the solid and phantom outline position 20a, while the stationary connection is shown in FIG. 1 in the form of a box 22. As part 20 moves the rolling conductor support 24 moves with it as shown in the solid outline position 24 and phantom position 24a. The conductor support carries conductors C which extend between the moving and stationary connections. In the phantom outline position the conductor support portion 24a may roll out and rest upon the floor or some other support 26, though if maximum travel of the moving connection be not too great, no support 26 beneath the portion 24a is required.

Referring now to FIGS. 2, 3 and 4, the rolling conductor support comprises a plurality of chains 26 and 28. In the illustrated embodiment two chains are shown though it will be apparent that three or more might be provided. The chains are connected together in laterally spaced relation, as shown in FIG. 3, by a plurality of transversely extending conductor supporting bridges 30. The bridges are arranged in spaced apart relation along the length of the chain. Though only two bridges are shown, it will be understood that a sufficient number are provided to adequately carry the conductors, for example, a bridge may be provided at every third chain link.

Figure 10:
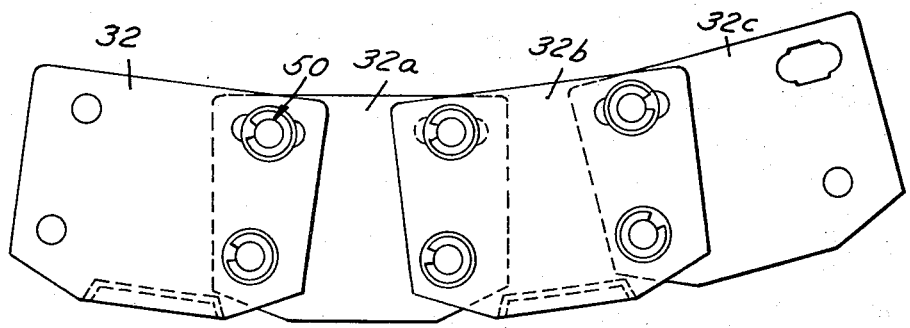
FIG. 10 is a detail similar to FIG. 2 of four links of one of the side chains showing a modified form of link-to-conductor supporting bridge connection.

The rolling conductor support of FIGS. 2, 3 and 4 comprises identical chains having identical flat links 32. Such links are connected together in a series or pattern of inside-outside-inside links, as shown at 32a, 32b, 32c and in FIGS. 2 and 3, for example. In other words, the links on either side and connected to a given link overlap such link on the same side, rather than on opposite sides. Each link is of generally rectangular configuration, being of somewhat greater length than height. The upper corners of each link, as shown at 34 and 36 are rounded to eliminate sharp edges that could catch on clothing, while the lower corners are beveled as at 38 and 40. This beveling of the lower corners serves to eliminate sharp projections which would engage and dig into the surface upon which the rolling conductor support is resting, for example floor 26 in FIG. 1, and tend to cause the chain to "walk" therealong as the support at its point of contact with the floor moves with the moving connection.

Each link 32 has four apertures extending therethrough, each adjacent a respective corner of the link. Three of the four apertures, indicated at 42, 44 and 46, are circular, while the fourth, shown at 48, is an elongated slot. The overlapping contiguous ends of the adjacent links are pivotally connected together adjacent their lower corners by pivot parts 50 shown in FIGS. 2, 3 and 4. Each pivot part comprises a cylindrical pin having head or retainer portions 52 and 54 at opposite ends, the head portion 52 being shown integral with the pin, while portion 54 may comprise a washer 56 and a snap ring 58 received in a circumferential groove adjacent the end of the pin. Obviously the pivot parts 50 could be in the form of a rivet if desired. It will be noted that in addition to providing axes for relative pivotal movement between links, the pivot parts retain the links against lateral separation. The upper corners of the links are likewise connected by pivot parts 60 which are identical to the pivot parts 50 already described, the different reference numerals being used to differentiate between pivot points at 50 and radius control points at 60.

It will be apparent from a study of FIG. 2 that the permitted swing of successive links, and in turn the bending radius of the rolling conductor support, will be determined by the amount of movement afforded the radius control points 60 and this is determined by the length of the slot 48. Obviously it is possible to provide links having varying slot lengths and thereby vary the radius of the chain curve, and such is contemplated in actual practice. Except for the length of the slot the links may be identical. This leads to substantial economy in manufacture of chains to meet various customer requirements. Of course, all links of any given chain would normally have the same slot length unless special circumstances dictated that in a given chain slots of certain links should have one length and those of other links another length to provide different radii of curvature along the length of the same rolling conductor support. Such would be unusual.

Opposite ends of each chain may be secured to its respective stationary or moving connection by an angle bracket 62 as shown in FIG. 1. Special mounting brackets for opposite ends of the chains may be provided if desired.

The chains are connected together by the transverse or laterally extending conductor supporting means comprising bridges 30, each of which is anchored at opposite ends at two points to its confronting links. As shown in FIGS. 3 and 4, each bridge comprises a plate having upturned ends 64 and 66, each of which is provided with a pair of apertures which register with two pivot points 50. Pins 50a, slightly longer than pins 50, but otherwise of identical construction, are extended through the aligned apertures of the bridge ends and the links. Alternately, the bridges 30 may be welded at their opposite ends to opposed links, in which event the bridge members extend between and are welded to the inner links of each chain such as those shown at 32a or 32c in FIG. 3. In the event the bridges are to be welded, the upturned ends 64 and 66 may be eliminated. The bridges are made in the form of a flat plate, which provides a strong, unitary structure of bridge and links, and also a lighter structure because the material of the upturned ends is eliminated.

The bridges shown in FIGS. 3 and 4 are each provided with two staggered rows of spaced apart clip or retainer receiving apertures 68 and 70. The apertures are so spaced that a pair of apertures bracket the conductors C of various diameters laid on the bridges. The staggered arrangement of the rows insures that there will be a pair of apertures closely bracketing any size or location of conductor on the bridge. The conductors are then retained on the bridge by spring clips 72 having resilient end portions extended through the apertures and locked therein against withdrawal by the conductor.

The clips or retainers may comprise a wire coated with a phenolic resin or other wear inhibiting insulating coating 74. The ends of the retainer may be folded upon themselves as shown to provide a tapered portion 76, an upwardly facing locking portion 78 and a stop 80. The length of each slot is sufficiently short in relation to the length of the locking face 78 and the thickness of the wire so that even if a strong outward pull is exerted on the clip by the conductor, the clip will not pull out, as bend 82 will engage the standing portion of the wire clip and limit movement of the locking face in an unlocking direction. In order to insert the folded ends of the clip through the apertures, bend 82 must be caused to by-pass the standing portion of the clip. This locking feature therefore assures that once the conductors have been anchored by the retainers, they will not be unintentionally dislodged from the bridges.

In practice the conductors are laid out along the bridges in suitable laterally spaced relation and then the clips are inserted through the apertures bracketing the conductors. This manner of retaining the conductors obviates the difficulties in the prior art wherein the conductors had to be threaded through holes in the bridges.

In FIGS. 5, 6 an 7, a modification of the conductor retainers is shown and the apertures through the bridges, one of which is shown partially at 83 in FIG. 5, are of a somewhat different configuration to accommodate such retainers. Each retainer comprises a strap or strip 84 of a somewhat resilient plastic shaped to provide along linear margins, or marginal edges 86 a succession of angularly outwardly extending tabs or ears 88 and 90 disposed at an acute angle with respect to the linear edges of the strap and resiliently connected thereto to deflect inwardly to allow each strap to be inserted through slots 92 in the bridges and be locked therein by the tabs as shown in FIG. 7. In FIG. 6 one of these modified straps is shown in top elevation stretched out flat. The apertures or slots 92 in the bridges 83 are sized to accommodate the straps, being of a length just slightly oversize the strap body defined by the marginal edges 86. A single row of closely spaced apertures will accommodate conductors of any given diameter.

The strap may be formed of nylon or other suitable plastic. It is intended to be used in lieu of the spring clips 72 heretofore described. The ears or tabs face in opposite directions in the opposite end portions of the strap, thus ears 88 face oppositely to ears 90. Tabs 90 may be slightly closer together, measured along the length of the strip than tabs 88, to permit more accurate sizing of the strap to different diameter conductors.

Each of the tabs or ears 88 and 90 has a distal end 94 which normally lies beyond the adjacent linear edge 86 of the strap to thus underlie the bridge as shown in FIG. 7 and prevent withdrawal of the strap. From such distal end back to the point of the joiner of the tab with the body of the strap, the tab is separated from the body by the notch or slot which is of sufficient width to allow the tab to be pressed laterally inwardly (in the plane of the strap) to enable the tabs to pass through the slots 92 of the bridge 83. As the strap is pushed down through the slots, the ears are cammed inwardly by the edges of the slots to allow them to pass therethrough, and after passage through the slots the ears spring outwardly to the position shown in FIG. 7 to underlie the bridge and prevent withdrawal of the strap.

Shown in FIGS. 8 and 9 is a modified link construction for the chains as shown, each of which links 100 comprises a generally planar plate whose opposite ends 102 and 104 are laterally offset from one another by substantially the thickness of the plate. The profile of one of the links 100 is clearly shown in FIG. 9. This offset in the links permits their contiguous ends to overlap with the resulting chain lying substantially in a plane. The upper corners 106 and 108 of each link are rounded, while the lower corners 110 and 112 are beveled as shown, similarly to the links 32 heretofore described. The links are further provided with four apertures each, the three shown at 114, 116 and 118 being circular, while the fourth 120 is elongate to determine and positively limit relative pivotal movement between the links and thus define the radius of curvature of the chain as the conductor support bends in its movement with the moving machine element. Pivot parts 50 and 60 identical to those described with reference to the structure shown in FIGS. 2, 3 and 4 serve to connect the links together. It will be noted that in a conductor support having chains of the character shown in FIGS. 8 and 9, the links of one chain will be allochiral with respect to the links of the opposite chain.

Figure 11:
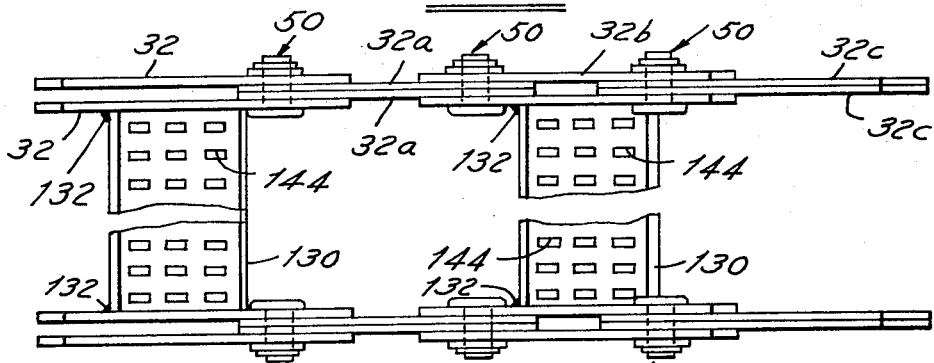
FIG. 11 is a plan view of a portion of a rolling conductor support incorporating the structure shown in FIG. 10.

Shown in FIGS. 10 and 11 is a slightly modified side chain formed of link members identical to those shown and previously described in reference to FIG. 2, but with each chain link comprising a double plate, i.e., 32—32, 32a–32a, 32b—32b and 32c—32c. The plates of alternate links are spaced apart to embrace therebetween the remaining links, as shown in FIG. 11. The double plate links add greatly to the strength and torsional rigidity of the rolling conductor support, making longer unsupported runs possible. The links are secured together for limited pivotal movement by pivot parts 50 identical to those previously described, but obviously of a slightly greater length to project through the greater thickness of the double plate links.

Figure 12:
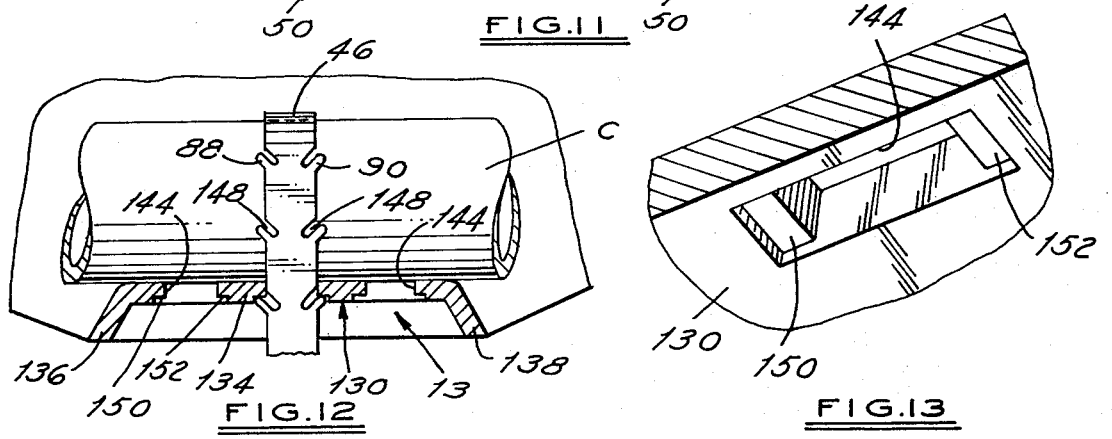
FIG. 12 is a cross-sectional view taken through one of the conductor supporting bridges of FIG. 11 showing the manner of retaining the conductors on the bridges.
Figure 13:
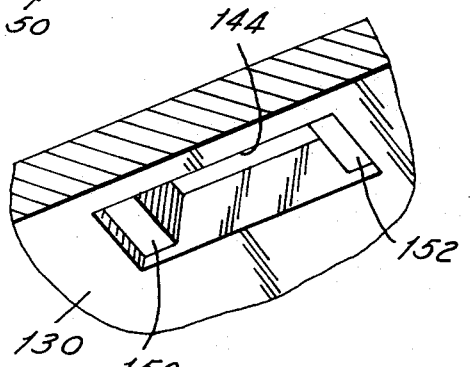
FIG. 13 is an enlarged partial view taken in the direction of the arrow 13 in FIG. 12.

Another feature of the support shown in FIGS. 10 and 11 is the construction of the conductor supporting bridges 130 which extend between the inner plates of links 32 and 32b, and are welded at opposite ends thereto, as indicated at 132. Each bridge 130 includes a substantially flat, horizontal middle portion 134 upon which the conductors C rest, and downturned flanges 136 and 138 along its opposite marginal edges. The flanges 136 and 138 provide a cross-sectional configuration as shown in FIG. 12, which adds strength and rigidity to the bridges. In addition, the upper corners adjacent conductor C shown at 140 and 142 are rounded, obviating any possibility of cutting or scraping the conductor covering as the support moves, as there is some slight relative motion between conductors C and bridges 130 and the support shifts.

The bridge members 130 shown most clearly in FIGS. 11 and 12 are provided with rows of rectangular apertures 144 to accommodate conductor retaining straps 146 similar to those shown in plan view at 84 in FIG. 6. The strap 146 shown in FIG. 12 is identical in configuration to the strap previously described, and is provided with angularly outwardly extending tabs or ears 88 and 90 along its opposite marginal edges. It differs from the strap 84 in that it has a thin web 148 joining each tab or ear to the main body portion of the strap 146. The bridge apertures 144 are each formed with shallow shoulders or steps 150 and 152 at opposite ends thereof, and upon insertion of the strap 146, the projecting ends of the tabs 88 and 90 seat against the shoulders to prevent withdrawal of the strap. The thin web portions 148 on the strap 146 are sufficiently deformable to permit insertion of the strap through the apertures 144 in one direction (downwardly as shown in FIG. 12) but are of such resiliency to spring the tabs outwardly into seating engagement with the shoulders 150 and 152 once they pass through the aperture to prevent also impart additional strength to the tabs to prevent their breaking off due to a retraction force. In addition the seating of the tab ends in the corner of the shoulders 150 and 152 as shown in FIG. 12 assists in overcoming any tendency for the tabs or shear or break off from a retraction force tending to pull the strap upwardly as shown in FIG. 12

Figure 15:
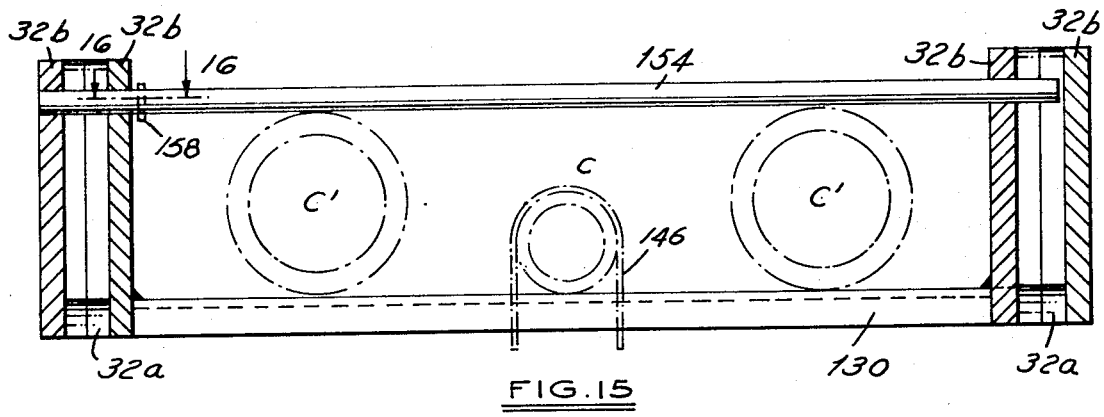
FIG. 15 is a cross sectional view of the rolling conductor support shown in FIG. 14.
Figure 16:
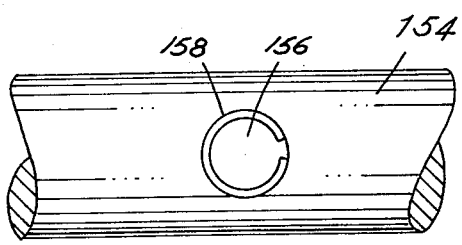
FIG. 16 is a partial sectional view taken along line 16—16 of FIG. 15.
Figure 14:
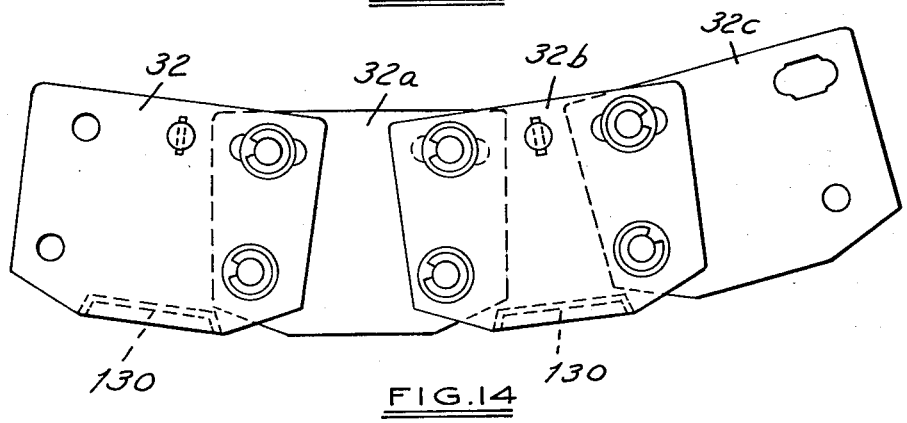
FIG. 14 is a detail similar to FIG. 10 showing a modified conductor retaining means.

In FIGS. 14–16 there is shown another conductor retaining means which may be utilized for conductors having a large diameter, such as are shown at $C^1$ in FIG. 15. The side chains of the support are identical to those shown in FIGS. 10 and 11, as are the bridges. As shown in FIG. 15, the bridges 130 are welded as at 132 to the inner plate of the links 32b, with the double plates 32a of the adjacent link being interposed between the two plates 32b.

To retain the conductors $C^1$ against dislodgement, each of the plates 32b except the outer one on the right side as viewed in FIG. 15 is apertured to accept a retaining rod 154 which is inserted overlying the conductors. A transverse hole 156 is drilled in the rod 154, and a roll pin 158 or other suitable retainer is inserted into the hole to prevent the rod from shifting longitudinally. The unapertured plate 32b prevents shifting of the rod in the opposite direction. If several large diameter conductors $C^1$ and one or more smaller conductors C are used on the same rolling conductor support, the retaining straps 146 may be used in conjunction with the retaining rods 154 as illustrated in FIG. 15.

The rolling conductor support having double plate side links with the bridges welded to the link plates provides a support which is much stiffer, enabling it to be used for horizontal applications, i.e., where the chain bending is about a vertical axis. FIG. 1 shows the stationary and moving connections vertically spaced, with bending about a horizontal axis. The support of FIGS. 10–16 is adaptable to such arrangement and also to an arrangement where the stationary and moving connections are spaced horizontally, and bending is about a vertical axis. While the welded bridge to chain construction adds to the strength of the support, it also contributes to ease and convenience of manufacture, as the bridges 130 may be made in long strips and then cut off in lengths to provide a rolling conductor support of any desired width.

What is claimed is:

1. A rolling conductor support comprising: a plurality of longitudinally extending chains connected together in laterally spaced apart relation by a succession of spaced apart bridge members extending therebetween, each chain including a succession of links having contiguous overlapping pivotally connected end portions, each pivotal connection having a pair of vertically spaced pivot parts extending laterally between and connecting together the overlapping end portions, the lower of said pivot parts providing a fulcrum for pivotal movement between the links, one of the overlapping end portions having a slot of determined length and the upper pivot part interfitting in said slot and fixed with respect to the other overlapping end portion and movable in the slot throughout the length thereof to limit pivotal movement between the links, alternate links of each chain including a pair of spaced parallel link plates embracing the contiguous overlapping end portions of the remaining links, and conductor retaining means comprising a plurality of rods extending through apertures in the chain links spaced vertically above said bridges and at least one stop pin projecting laterally through each rod to retain the rod against substantial longitudinal movement.

* * * * *